US007995879B2

(12) United States Patent
Bowers et al.

(10) Patent No.: US 7,995,879 B2
(45) Date of Patent: Aug. 9, 2011

(54) SURFACE STATE GAIN

(75) Inventors: Jeffrey A. Bowers, Kirkland, WA (US);
Peter L. Hagelstein, Carlisle, MA (US);
Roderick A. Hyde, Redmond, WA (US);
Jordin T. Kare, Seattle, WA (US);
Nathan P. Myhrvold, Medina, WA (US); Clarence T. Tegreene, Bellevue, WA (US); Lowell L. Wood, Jr., Bellevue, WA (US)

(73) Assignee: The Invention Science Fund I, LLC

( * ) Notice: Subject to any disclaimer, the term of this patent is extended or adjusted under 35 U.S.C. 154(b) by 99 days.

(21) Appl. No.: 12/462,134

(22) Filed: Jul. 28, 2009

(65) Prior Publication Data

US 2011/0026874 A1 Feb. 3, 2011

(51) Int. Cl.
*G02B 6/12* (2006.01)
(52) U.S. Cl. ........................................................ 385/14
(58) Field of Classification Search .................. None
See application file for complete search history.

(56) References Cited

U.S. PATENT DOCUMENTS

| | | | |
|---|---|---|---|
| 6,501,783 | B1 | 12/2002 | Capasso et al. |
| 6,563,981 | B2 | 5/2003 | Weisberg et al. |
| 6,728,439 | B2 | 4/2004 | Weisberg et al. |
| 6,895,154 | B2 | 5/2005 | Johnson et al. |
| 7,151,789 | B2 | 12/2006 | Jette et al. |
| 7,218,440 | B2 | 5/2007 | Green |
| 7,224,863 | B1 | 5/2007 | Li et al. |
| 7,231,122 | B2 | 6/2007 | Weisberg et al. |
| 7,251,258 | B2 | 7/2007 | Wise et al. |
| 7,310,466 | B2 | 12/2007 | Fink et al. |
| 2002/0021445 | A1 | 2/2002 | Bozhevolnyi et al. |
| 2003/0147616 | A1 | 8/2003 | Dickson et al. |
| 2004/0131102 | A1 | 7/2004 | Jette et al. |
| 2004/0155184 | A1 | 8/2004 | Stockman et al. |
| 2005/0237602 | A1 | 10/2005 | Yanagisawa |
| 2010/0060977 | A1* | 3/2010 | Karalis et al. ............... 359/332 |

OTHER PUBLICATIONS

Alam et al.; "Gain Assisted Surface Plasmon Polariton in Quantum Wells Structures"; Optics Express; Jan. 8, 2007; pp. 176-182; vol. 15; No. 1; Optical Society of America.

Bergman et al.; "Surface Plasmon Amplification by Stimulated Emission of Radiation: Quantum Generation of Coherent Surface Plasmons in Nanosystems"; Physical Review Letters; Jan. 17, 2003; pp. 027402-1-027402-4; vol. 90; No. 2; The American Physical Society.

Boltasseva et al.; "Integrated Optical Components Utilizing Long-Range Surface Plasmon Polaritons"; Journal of Lightwave Technology; Jan. 2005; pp. 413-422; vol. 23, No. 1; IEEE.

Dionne et al.; "Plasmon Slot Waveguides: Towards Chip-Scale Propagation with Subwavelength-Scale Localization"; Physical Review B; bearing dates of Jul. 9, 2005, Nov. 2, 2005 and Jan. 5, 2006; pp. 035407-1-305407-9; vol. 73; The American Physical Society.

Enkrich et al.; "Magnetic Metamaterials at Telecommunication and Visible Frequencies"; Physical Review Letters; Nov. 11, 2005; pp. 203901-1-203901- 4; vol. 95; The American Physical Society.

Fink et al.; "A Dielectric Omnidirectional Reflector"; Science; Nov. 27, 1998; pp. 1679-1682; vol. 282.

Li et al.; "Surface Plasmon Amplification by Stimulated Emission in Nanolenses"; Physical Review B; bearing dates of Jul. 16, 2004, Dec. 15, 2004 and Mar. 10, 2005; pp. 115409-1-115409-5; vol. 71; The American Physical Society.

Nezhad et al.; "Gain Assisted Propagation of Surface Plasmon Polaritons on Planar Metallic Waveguides"; Optics Express; Aug. 23, 2004; pp. 4072-4079; vol. 12; No. 17; Optical Society of America.

Noginov et al.; "Enhancement of Surface Plasmons in an Ag Aggregate by Optical Gain in a Dielectric Medium"; Optics Letters; Oct. 15, 2006; pp. 3022-3024; vol. 31; No. 20; Optical Society of America.

Pile, David F.P.; "Gap Modes of One-Dimensional Photonic Crystal Surface Waves"; Jul. 10, 2005 (printed on Jul. 10, 2009); Applied Optics; pp. 4398-4401 (printed copy numbered pp. 1-12); vol. 44; Issue 20; Optical Society of America.

Rana, Farhan; "Graphene Terahertz Plasmon Oscillators"; IEEE Transactions on Nanotechnology; Jan. 2008; pp. 91-99; vol. 7; No. 1; IEEE.

Shvets, Gennady; "Photonic Approach to Making a Material With a Negative Index of Refraction"; Physical Review B; 2003; pp. 035109-1-035109-8; vol. 67; The American Physical Society.

Smith, D.R., et al.; "Metamaterials and Negative Refractive Index"; Science; Aug. 6, 2004; pp. 788-792; vol. 305; AAAS.

Stockman, Mark I.; "Spasers Explained"; Nature Photonics; Jun. 2008; pp. 327-329; vol. 2; Nature Publishing Group.

Tredicucci et al.; "Single-Mode Surface-Plasmon Laser"; Applied Physics Letters; Apr. 17, 2000; pp. 2164-2166; vol. 76; No. 16; American Institute of Physics.

Yablonovitch, Eli; "Photonic Crystals: Semiconductors of Light"; Scientific American; Dec. 2001; pp. 47-55 (pp. 52-53 intentionally omitted—advertisements); Scientific American, Inc.

* cited by examiner

*Primary Examiner* — Sung Pak

(57) ABSTRACT

A gain medium may be arranged to provide energy to a surface state.

28 Claims, 11 Drawing Sheets

Start → evanescently providing gain energy to a propagating surface state at a first boundary region including an interface between first and second media, from a third medium spaced apart from the interface and separate from the first and second media — 1002 → End

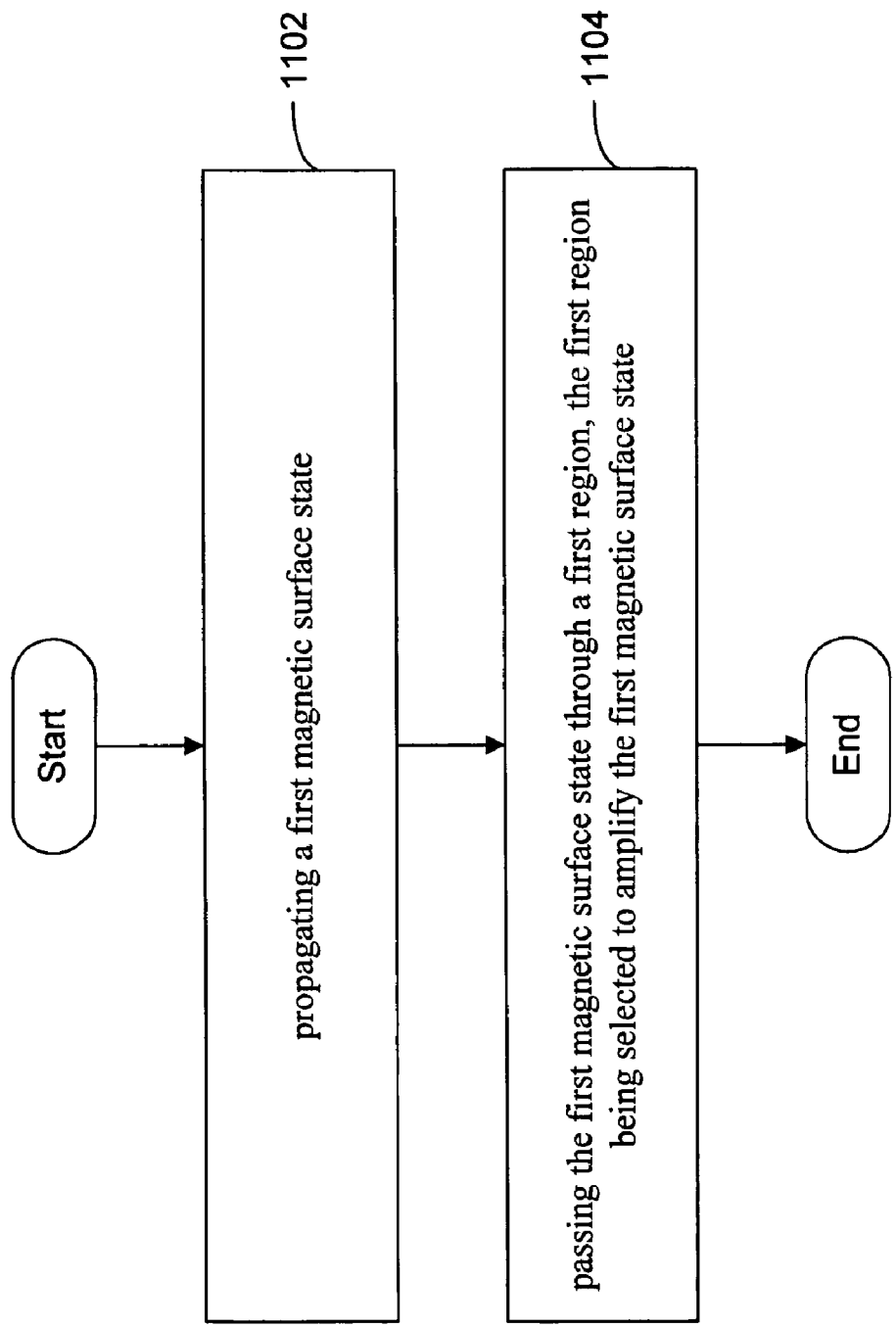

SURFACE STATE GAIN

SUMMARY

In one embodiment, an apparatus comprises: a first dielectric boundary region arranged to support a first dielectric surface state; and a first gain medium selected to amplify the first dielectric surface state, wherein the first gain medium is arranged relative to the first dielectric boundary region for amplification of the first dielectric surface state.

In another embodiment, a method comprises: propagating a first dielectric surface state; and passing the first dielectric surface state through a first region, the first region being selected to amplify the first dielectric surface state.

In another embodiment, an apparatus comprises: a first layer including a first medium; a second layer spaced apart from the first layer, the second layer including a first gain medium; and a third layer at least partially interposed between the first layer and the second layer and including a third medium different from the first medium and the first gain medium, wherein the first layer and the third layer form a first boundary supportive of a first propagating surface state, and wherein the first gain medium is configured to evanescently couple to the first surface state.

In another embodiment, an apparatus comprises: a first layer including a first medium; a third layer including a third medium, wherein the first layer and the third layer form a first boundary supportive of a first propagating surface state; and a second layer spaced apart from the first boundary and including a first gain medium configured to evanescently couple to the first propagating surface state.

In anther embodiment, a method comprises: evanescently providing gain energy to a propagating surface state at a first boundary region including an interface between first and second media, from a third medium spaced apart from the interface and separate from the first and second media.

In another embodiment, an apparatus comprises: a first magnetic boundary region arranged to support a first magnetic surface state; and a first gain medium selected to amplify the first magnetic surface state, wherein the first gain medium is arranged relative to the first magnetic boundary region for amplification of the first magnetic surface state.

In another embodiment, a method comprises: propagating a first magnetic surface state; and passing the first magnetic surface state through a first region, the first region being selected to amplify the first magnetic surface state.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE FIGURES

FIG. 11 is a flow chart depicting a method.

DETAILED DESCRIPTION

Figure 1:
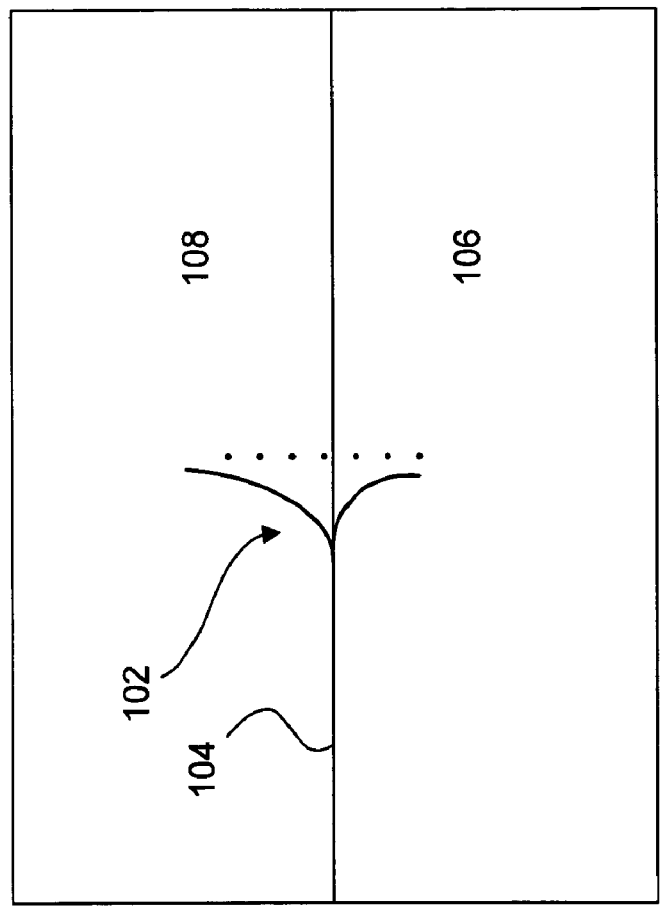
FIG. 1 shows a surface state at a boundary.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here.

A surface state may exist on a boundary between two media when the real parts of their dielectric constants $\in$ and $\in'$ or the real parts of their permeabilities $\mu$ and $\mu'$ and have different signs. FIG. 1 shows a surface state 102 at a boundary 104 of a first medium 106 and a second medium 108, where the first and second media 106, 108 are selected such that they support the surface state 102. The boundary 104, although shown as being substantially continuous and planar, may have a different shape. The surface state 102, although shown as including substantially exponential functions with a field maximum at the boundary 104, may include only approximately exponential functions, may be described by a different function, and/or may have a field maximum someplace other than the boundary. Further, although the surface state 102 is shown at a certain location on the boundary 104 for illustrative purposes, the spatial distribution of the surface state 102 may be anything.

In one embodiment the surface state 102 may be a plasmon. In this case the medium 106 is a conductor and the medium 108 is a dielectric, where the conductor may be a high conductivity metal such as gold or silver, or may be a different conductor. The dielectric forming the boundary 104 with the conductor may be: air, vacuum, or its equivalent; a substantially homogeneous dielectric material; or a different material or structure. Although the term "plasmon" is used in this illustration to describe a state propagating at the boundary between a conductor and a dielectric, one skilled in the art may recognize that other terms may have been applied to describe such states, including, but not limited to, "surface plasmon" and/or "surface plasmon polariton".

In some embodiments the material thickness 110 may be smaller than the plasmon wavelength, as described in Alexandra Boltasseva, Thomas Nikolajsen, Krisjan Leosson, Kasper Kjaer, Morten S. Larsen, and Sergey I. Bozhevolnyi, "INTEGRATED OPTICAL COMPONENTS UTILIZING LONG-RANGE SURFACE PLASMON POLARITONS", Journal of Lightwave Technology, January, 2005, Volume 23, Number 1, which is incorporated herein by reference. Further, Boltasseva describes how a metal may be embedded in a dielectric to allow propagation of long-range surface plasmon polaritons, where the parameters of the metal (including thickness 110) may control the propagation of the plasmon.

In another embodiment, the surface state 102 may be a magnetic surface state. In this case, the medium 106 has an effectively negative permeability $\mu$ and the medium 108 has a positive permeability $\mu'$. The medium 106 having an effectively negative permeability $\mu$ may be, for example, a metamaterial. One example of a metamaterial having an effectively negative permeability μ is described in C. Enkrich et al., "MAGNETIC METAMATERIALS AT TELECOMMUNICATION AND VISIBLE FREQUENCIES", Physical Review Letters, 11 Nov. 2005, Volume 95, pages 203901-1—203901-4, which is incorporated herein by reference. Metamaterials are also described in D. R. Smith et al., "METAMATERIALS AND NEGATIVE REFRACTIVE INDEX", Science, 6 Aug. 2004, Volume 305, pages 788-792, which is incorporated herein by reference. Metamaterials having a variety of properties may be achieved, including those with negative permittivity $\in$.

In another embodiment, the surface state 102 may be a dielectric surface state. In this case, both media 106 and 108 are dielectrics, where one of the dielectrics has a negative, or effectively negative, permittivity.

One example of a dielectric surface state is the case where one of the dielectrics includes a polar dielectric having a Restrahlen band. These dielectrics have a frequency-dependent dielectric permittivity that is negative in a certain frequency range. Examples of polar dielectrics having a Restrahlen band include, but are not limited to, silicon carbide (SiC), lithium tantalate ($LiTaO_3$), lithium fluoride (LiF), and zinc selenide (ZnSe). Polar dielectrics having a Restrahlen band are described in Gennady Shvets, "PHOTONIC APPROACH TO MAKING A MATERIAL WITH A NEGATIVE INDEX OF REFRACTION," Physical Review B, 16 Jan. 2003, Volume 67, pages 035109-1—035109-8, which is incorporated herein by reference.

Another example of a dielectric surface state is the case where one or both of the dielectrics is a medium having a band gap, such as a photonic crystal. A surface state may exist at the interface between the photonic crystal and the other dielectric in the forbidden energy bands of the photonic crystal. Photonic crystals are described in E. Yablonovitch, "PHOTONIC CRYSTALS: SEMICONDUCTORS OF LIGHT", Scientific American, December 2001, Volume 285, Number 6, pages 47-55, which is incorporated herein by reference.

Although the embodiments described with respect to FIG. 1 refer to the first and second materials 106, 108, where the first material 106 is shown below the second material 108, generally the first and second materials 106, 108 are interchangeable; that is, the material 108 may be the bottom layer and the material 106 may be the top layer. Further, in some embodiments the boundary 104 may be vertical or may have some other orientation than the horizontal representation of FIG. 1.

Generally speaking, "boundary region" refers to a region proximate to a boundary. For example, the boundary region of FIG. 1 includes the region, proximate to the boundary 104, in the first and second media 106, 108 into which the surface state 102 extends. A dielectric boundary region may be configured to support a dielectric surface state as previously defined. Similarly, a magnetic boundary region may be configured to support a magnetic surface state as previously defined, etc.

Figure 2:
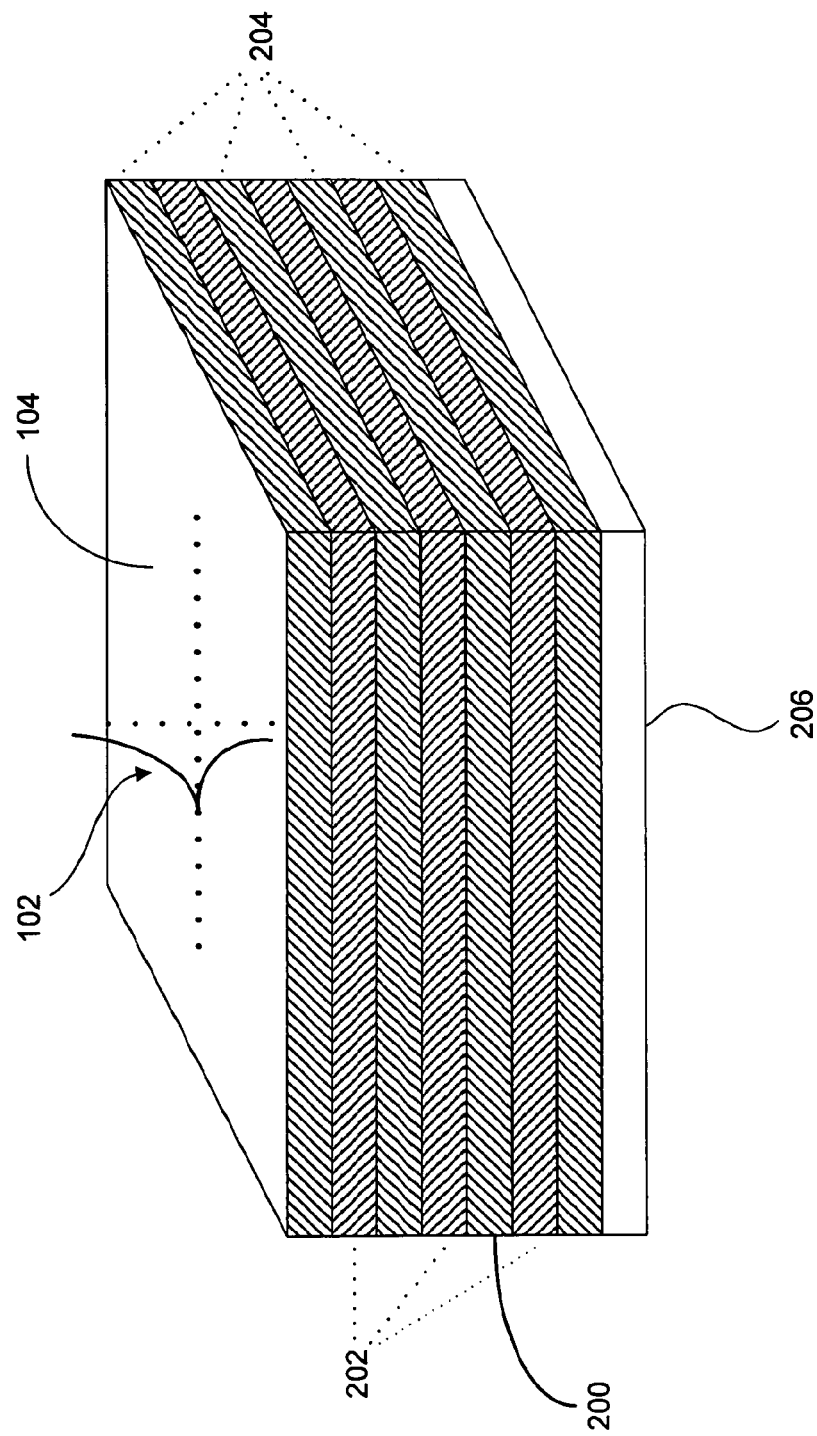
FIG. 2 shows a surface state at a boundary of a photonic crystal structure.

FIG. 2 shows a surface state 102 at the boundary 104 of the first photonic crystal structure 200, where the first photonic crystal structure 200 includes a 1D photonic crystal comprising layers of a first material 202 and a second material 204 fabricated on a substrate 206. Examples of 1D photonic crystals are given in Yablonovitch and in Y. Fink, J. N. Winn, S. Fan, C. Chen, J. Michel, J. D. Joannopoulos, and E. L. Thomas, "A DIELECTRIC OMNIDIRECTIONAL REFLECTOR", Science, Nov. 27, 1998, Volume 282, pages 1679-1682, which is incorporated herein by reference.

Although the first photonic crystal structure 200 is shown having alternating layers of a first material 202 and a second material 204, where the layers have substantially equal thicknesses, the layer thicknesses and materials 202, 204 may be chosen according to the design of the first photonic crystal structure 200, and the layer thicknesses may vary. For example, the design of the first photonic crystal structure 200 may be such that the layer thicknesses are configured to vary, the layer thicknesses may vary slightly due to fabrication imperfections, the structure may include a top layer having a thickness inconsistent with the periodicity of the remainder of the first photonic crystal structure 200, and/or there may be other reasons for variations in the layer thicknesses. Although the first photonic crystal structure 200 is shown having two different materials 202, 204, it may have more than two types of materials. Further, although the first photonic crystal structure 200 is shown having seven layers in FIG. 2, it may have a different number of layers. The first photonic crystal structure 200 in FIG. 2 is shown as a 1D photonic crystal for exemplary purposes, but in other embodiments the first photonic crystal structure 200 may be a 2D or 3D photonic crystal structure, and may have variations analogous to those described for a 1D photonic crystal structure.

Although the surface states 102 previously described include plasmons, dielectric surface states, and magnetic surface states, those skilled in the art may recognize that these types of surface states as previously described may be labeled by other terms. For example, as described previously, a "plasmon" may be alternately labeled as a "surface plasmon" or "surface plasmon polariton". Further, those skilled in the art may recognize other types of surface states and/or other configurations for producing those types of surface states listed above.

Figure 3:
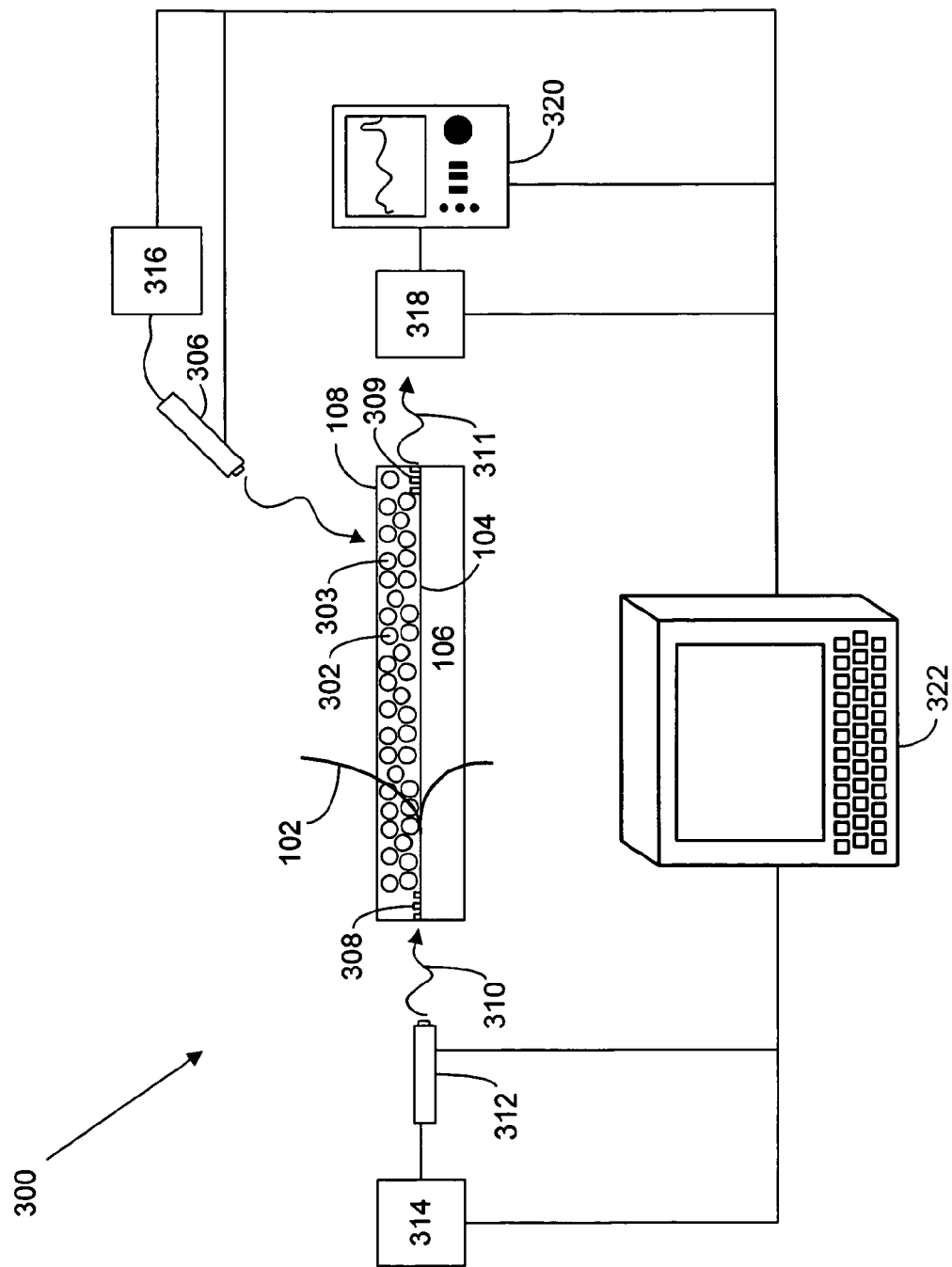
FIG. 3 shows a surface state at a boundary and a gain medium.

FIG. 3 shows a surface state 102 at the boundary 104 between a first medium 106 and a second medium 108, where in this embodiment the second medium 108 includes a gain medium 302 (here, quantum dots 303). The quantum dots 303 are excited via a source 306 of electromagnetic energy, where the source 306 may be a laser, a lamp, or a different source of electromagnetic energy, and transfer energy to the surface state 102.

The embodiment of FIG. 3 further includes an apparatus 308 configured to convert radiative electromagnetic energy 310 into the surface state 102, where in the embodiment shown in FIG. 3, the radiative electromagnetic energy 310 is produced by a laser 312. In FIG. 3, the apparatus 308 configured to convert radiative electromagnetic energy 310 into the surface state 102 is a grating, however, other embodiments may include a different apparatus (such as a prism, metallic film, or other device or structure) for converting radiative electromagnetic energy 310 into a surface state 102.

An analogous apparatus 309 is configured to convert the surface state 102 into radiative electromagnetic energy 311, and a detector 318 is arranged to receive the radiative electromagnetic energy 311. A display 320 is operably connected to the detector 318 to display information related to the detected radiative electromagnetic energy 311.

Although FIG. 3 shows radiative electromagnetic energy 310 converted into a surface state 102 and a surface state 102 converted into radiative electromagnetic energy 311, in some embodiments it may be desirable to convert one type of surface state into a different type of surface state (for example, a magnetic surface state into a dielectric surface state) by altering the properties of the boundary along which the surface state 102 propagates. Such a conversion does not require an apparatus 308 or 309 and can be achieved by placing the boundaries sufficiently proximate for coupling.

The first and second media 106, 108 may be any of the combinations previously described as supportive of a surface state. For example, where the surface state 102 is a dielectric surface state, the first medium 106 may be a photonic crystal or a polar dielectric having a Restrahlen band and the second medium 108 may be a dielectric with embedded quantum dots. Or, the two media may be reversed: where the second media 108 is a photonic crystal or a polar dielectric having a Restrahlen band, with embedded quantum dots, and the first medium 106 is a different dielectric.

These are just a few examples of the different configurations of the embodiment shown in FIG. 3. Generally, the media 106, 108 can be any of the combinations previously described with respect to FIG. 1, or any combination that supports a surface state, and the quantum dots may be embedded in either or both media 106, 108.

Although the gain medium 302 shown in FIG. 3 includes quantum dots 303, in other embodiments the gain medium 302 may include one or more different materials. Such gain media and mechanisms for pumping the gain media may be similar to those used in conventional lasers. In some embodiments the gain medium may be a gas, which may include: a mixture of helium and neon, such as in a HeNe laser; carbon dioxide ($CO_2$), such as in a $CO_2$ laser; a mixture of argon and krypton such as in an ion laser; and/or a different type and/or mixture of gas. In other embodiments, the gain medium may include a crystal and/or a glass, such as: neodymium-doped yttrium aluminum garnet such as in a Nd:YAG laser; titanium-doped sapphire such as in a Ti:sapphire laser; or a different type of crystal or glass. These are just a few examples of the many kinds of gain media, and one skilled in the art may apply a different gain media than previously described according to the particular application.

The gain medium may be pumped electrically or electromagnetically (where electromagnetic pumping is shown in FIG. 3), depending on the type of medium. For example, where the gain medium includes a gas, the medium may be electrically pumped. Where the gain medium includes a crystal and/or a glass, the medium may be electromagnetically pumped. Pumping of gain media is known to those skilled in the art, and the pumping mechanism for a particular embodiment may be determined by the gain medium and its configuration. Further, those of skill in the art recognize that other names, such as "optical pumping" may be used for "electromagnetic pumping".

The spatial distribution of the gain medium 302 may be selected according to a specific embodiment. For example, in some embodiments the gain medium 302 may be placed in substantially regular intervals along the path of a surface state 102 to amplify the surface state 102 regularly as it propagates. In some embodiments the quantum dots 303 may be close-packed, and in other embodiments the quantum dots 303 may be spaced apart by a random or regular spacing. There are many ways in which the gain medium may be configured and one skilled in the art may arrange the gain medium 302 according to a particular embodiment.

Further, although FIG. 3 shows just one source 306 of electromagnetic energy incident on the gain medium 302, other embodiments may include more than one source 306 of electromagnetic energy. Further, although the source 306 is shown as a laser in the embodiment of FIG. 3, in other embodiments the source 306 may be, for example, a lamp extending along part or all of the length of the gain medium 302.

The embodiment shown in FIG. 3 further shows first and second power supplies 314, 316 operably connected to the sources 312, 306 of electromagnetic energy. Power may be supplied to one or more sources such as the sources 312, 306 via one or more power supplies 314, 316, where in some embodiments a single power supply may power all of the sources 312, 306, in other embodiments each source 312, 306 may be powered separately, or there may be a different permutation according to the particular embodiment. In other embodiments the power supplies 314, 316 may be operably connected to provide power to a different combination of components of the system, for example, more components or less components or simply a different combination of components. A power supply such as 314, 316 may be employed to provide power to any number of electronic instruments and/or circuitry that may be implemented in a system such as the system shown in FIG. 3.

Circuitry 322 is operably connected to each of the sources 306, 312, each of the power supplies 314, 316, the detector 318, and the display 320. The circuitry may be configured to determine one or more outputs of the sources 306, 312 (for example, amplitude, frequency, or a different property of the electromagnetic energy output). The circuitry may further be configured to receive information from the detector 318, and may send information to the display 320. These are just a few examples of how the circuitry 322 may be employed with the system 300 shown in FIG. 3. For example, in some embodiments the circuitry 322 and the display 320 may be housed in the same component. The detector 318 is shown in FIG. 3 as being arranged to detect the radiative electromagnetic energy 311, however in other embodiments the system may include a different number or combination of detectors 318, which may be configured to detect electromagnetic energy or a different type of signal, depending on the embodiment. Further, several of the components of the system 300 are shown as being substantially separate from one another, however in some embodiments some or all of these components may be co-located, such as being in the same housing. There are many different ways that the system of FIG. 3 may be configured and one skilled in the art may tailor the number, type, and configuration of the components according to a particular embodiment. Further, although many of the components shown in FIG. 3 are not shown in the embodiments shown and described in the remaining Figures, these components (such as a power supply, detector, circuitry, and/or display) may be incorporated into the embodiments shown and described in the remaining Figures.

Figure 4:
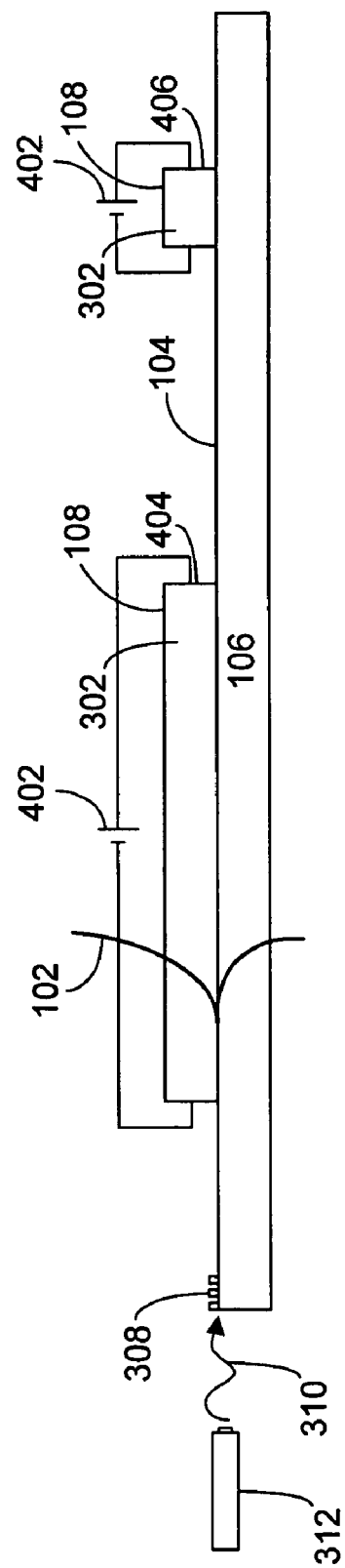
FIG. 4 shows a surface state at a boundary and a gain medium.

FIG. 4 shows an embodiment similar to that of FIG. 3. However, in FIG. 4 the gain medium 302 is a gas (for example, a mixture of helium and neon as in a He—Ne laser) that is electrically pumped via the applied voltage 402. Further, to illustrate how the distribution of the gain medium 302 may vary, the gain medium 302 in FIG. 4 is separated into two different sections, such that a surface state 102 propagating along the boundary 104 will first be amplified by the first gain section 404, and then will be amplified by the second gain section 406.

The embodiment of FIG. 4, as in the embodiment of FIG. 3, includes an apparatus 308 configured to convert radiative electromagnetic energy into the surface state 102, where again the radiative electromagnetic energy 310 is produced by a source 312 of electromagnetic energy.

Also as in FIG. 3, the first and second media 106, 108 may be any of the combinations previously described as supportive of a surface state when one of the media (106 or 108) is a gas.

Figure 5:
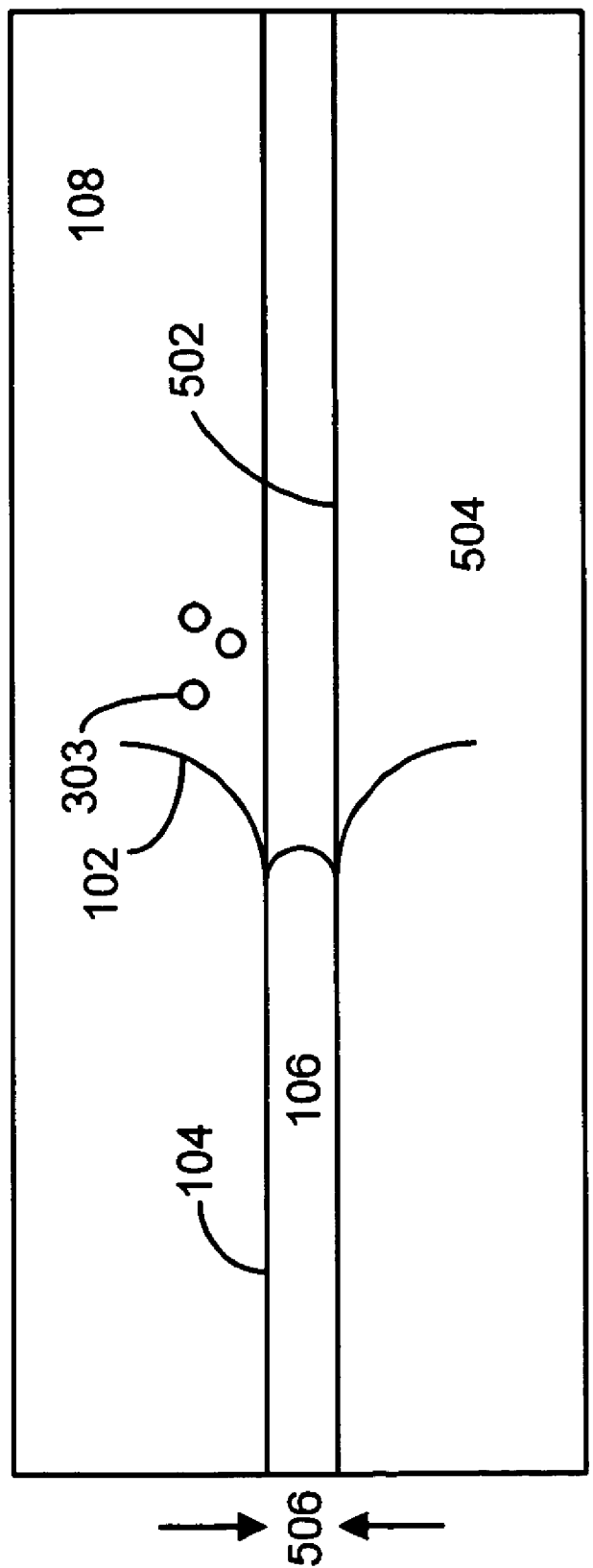
FIG. 5 shows a surface state at two boundaries and a gain medium.

FIG. 5 shows a surface state 102 at a boundary 104 having a second boundary 502 that is substantially parallel to the boundary 104. The first and second media 106, 108 are, as previously described with respect to FIG. 1, configured to support a surface state. Further, the third medium 504 that forms a boundary with the first medium 106 is selected such that the second boundary 502 supports a surface state. The third medium 504 may be the same or different from the second medium 108. In some embodiments the thickness 506 of the first medium 106 may be sufficiently small such that the surface states on each of the boundaries 104, 502 couple to form a single propagating state 102 as shown in FIG. 5.

In FIG. 5, the third medium 504 is the same as the second medium 108, and the surface state 102 is a symmetric mode. However, in other embodiments the third medium 504 may be different from the second medium 108.

Although the surface state 102 is shown for clarity as one surface state, depending on the thickness 506 and type of medium of the first medium 106, there may be a surface state on each of the boundaries 104, 502, where the two surface states may couple as shown in FIG. 5 to form one surface state, the surface states may not couple, and/or there may be minimal coupling of the two surface states, depending on the particular configuration.

In the embodiment of FIG. 5, quantum dots 303 are shown symbolically as the gain medium, and are shown as being included in the second medium 108. However, as described previously with respect to FIGS. 3 and 4, the gain medium may be included in any of the first, second, and/or third media 106, 108, 504, and/or may be any of the gain media as previously described.

One particular embodiment of the structure shown in FIG. 5 is the metal-insulator-metal (MIM) structure, where the second and third media 108, 504 are metal and where the first medium 106 is a dielectric. In particular, this arrangement is supportive of a transverse electric (TE) surface state mode. MIM structures are described in J. A. Dionne et al., "PLASMON SLOT WAVEGUIDES: TOWARDS CHIP-SCALE PROPAGATION WITH SUBWAVELENGTH-SCALE LOCALIZATION", Physical Review B, 5 Jan. 2006, Volume 73, pages 035407-1—035407-9, which is incorporated herein by reference.

Figure 6:
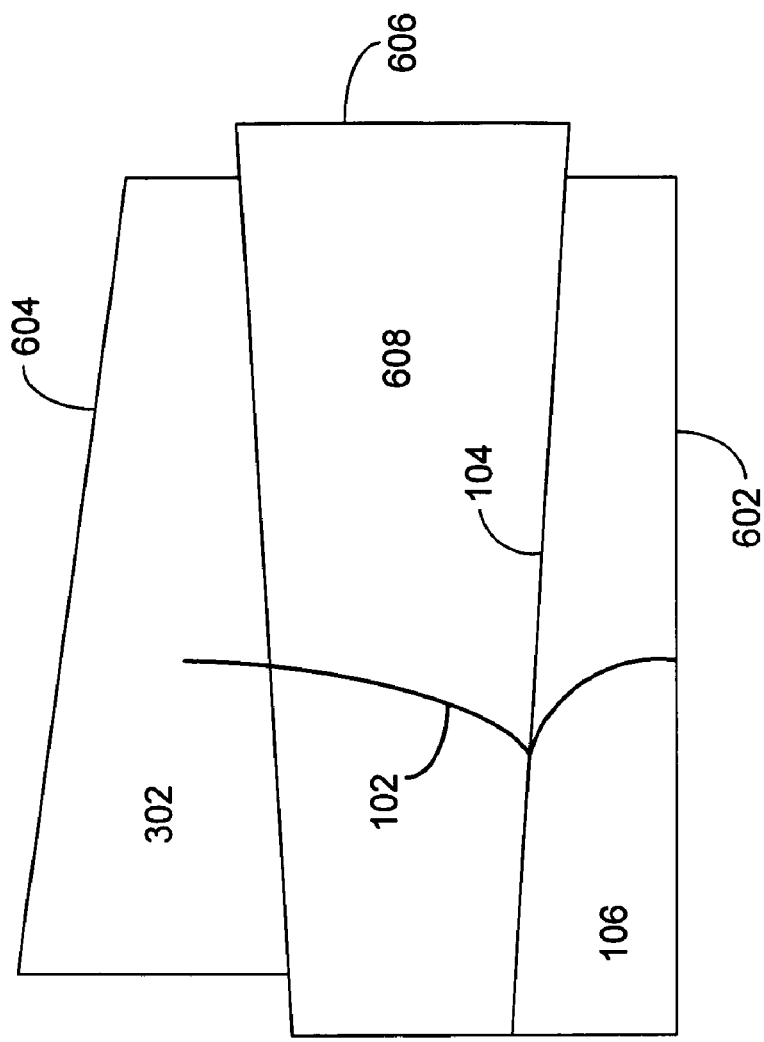
FIG. 6 shows an apparatus including first, second, and third layers.

FIG. 6 shows an embodiment having a first layer 602 including a first medium 106, a second layer 604 including a gain medium 302 (where the gain medium and its distribution may take a variety of different forms according to a particular embodiment, as previously described), and a third layer 606 at least partially interposed between the first layer 602 and the second layer 604. The embodiment further includes a third layer 606 interposed between the first layer 602 and the second layer 604 and including a third medium 608 different from the first medium 106 and the gain medium 302, wherein the first layer 602 and the third layer 606 form a first boundary 104 supportive of a first propagating surface state 102, and wherein the gain medium 302 is configured to evanescently couple to the first propagating surface state 102.

The embodiment shown in FIG. 6 may also include a fourth layer including a fourth medium (not shown) interposed between the third layer 606 and the second layer 604, wherein the fourth layer and the third layer 606 form a second boundary (also not shown) supportive of the first propagating surface state 102. Such a configuration may produce a surface state 102 having a distribution like that shown in FIG. 5.

Although not specifically shown in FIG. 6, this embodiment, along with the other embodiments shown in FIGS. 1-10 may include other aspects shown in other figures, such as the source 306 of electromagnetic energy shown in FIG. 3 (where the gain medium 302 is electromagnetically pumped), the applied voltage 402 (where the gain medium 302 is electrically pumped), the apparatus 308 configured to convert radiative electromagnetic energy into a surface state (and/or from a surface state into radiative electromagnetic energy), and/or a different aspect of the other embodiments.

Further, the layers 602, 604, 606 are shown as being irregularly-shaped for illustrative purposes, and the specific shape of the layers 602, 604, 606 may depend on the particular application.

Further, although three layers 602, 604, 606 are shown in FIG. 6, other embodiments may include more than three layers. For example, some embodiments may include a fourth layer, which may be located under the first layer 602 or in a different location. The fourth layer may include a second gain medium, not shown, which may couple evanescently to the first propagating surface state 102. In this case, the second gain medium may be different from, or the same as, the first gain medium 302.

Although the third layer 606 and the third medium 608 are shown in FIG. 6 as having a volume defined by sides, in some embodiments the third layer 606 may simply be a gap between the first layer 602 and the second layer 604, and in such case the third medium 608 may simply be air or a different gas, vacuum, or another ambient medium. In this embodiment the coupling between the gain medium 302 and the surface state 102 may be varied by varying the separation between the first layer 602 and the second layer 604, where the separation may be varied piezo-electrically or in another way.

Figure 7:
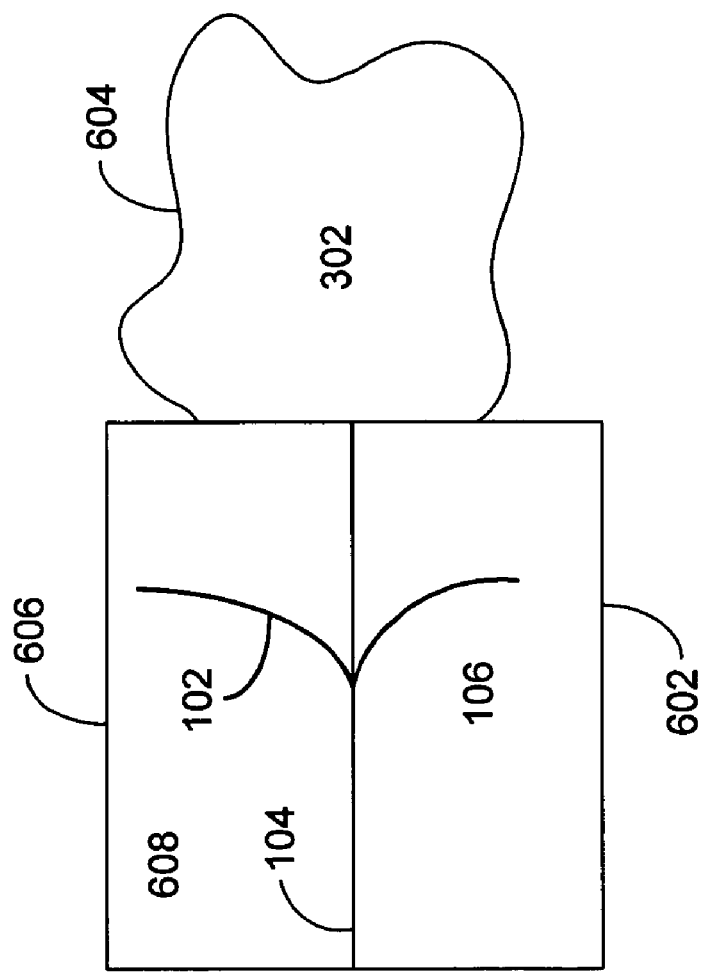
FIG. 7 shows an apparatus including first, second, and third layers.

FIG. 7 shows an embodiment similar to the embodiment shown in FIG. 6, where the apparatus comprises a first layer 602 including a first medium 106, a third layer 606 including a third medium 608, wherein the first layer 602 and the third layer 606 form a first boundary 104 supportive of a first propagating surface state 102. The apparatus further comprises a second layer 604 spaced apart from the first boundary 104 and including a first gain medium 302 configured to evanescently couple to the first propagating surface state 102.

FIG. 7 shows a cross-section of an apparatus supportive of the first propagating surface state 102, such that the first propagating surface state 102 propagates in a direction into the page (versus the embodiment shown in FIG. 6, where the embodiment is shown with the first propagating surface state 102 propagating along the page). In the embodiment shown in FIG. 7, the second layer 606 is shown having a substantially amorphous shape, however in other embodiments the second layer 606 may have a substantially regular shape. The second layer 604 couples to the first propagating surface state 102 evanescently as the first propagating surface state 102 propagates in a direction into the page.

Although FIGS. 6 and 7 have shown two different configurations of the second layer 604 relative to the first and third layers 602, 606 (FIG. 6 shows the second layer 604 between the first and third layers 602, 606; FIG. 7 shows the second layer 604 substantially beside the first and third layers 602, 606), other configurations of the second layer 604 relative to the first and third layers 602, 606 may be arranged such that the first propagating surface state 202 may couple evanescently to the gain medium 302 in the second layer 604. For example, with reference to FIG. 7, the second layer 604 may not be in intimate contact with the first and third layers 602, 606, but may be spaced apart. Further, although both FIGS. 6 and 7 are shown as substantially two-dimensional representations for clarity, in some embodiments the configuration of the second layer 604 may vary in three dimensions relative to the first and third layers 602, 606.

Figure 8:
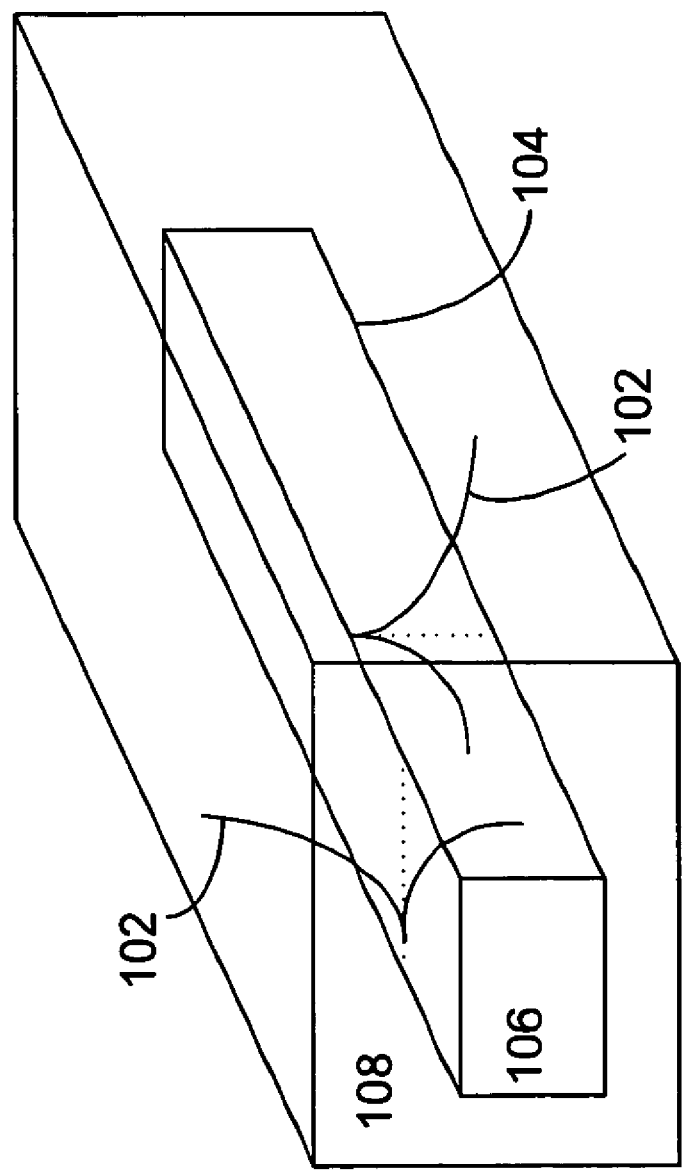
FIG. 8 shows an apparatus having a three-dimensional boundary.

FIG. 8 shows an embodiment where the boundary 104 is three-dimensional, such that the second medium 108 partially surrounds the first medium 106, and where a surface state is supported where the first medium 106 meets the second medium 108. The surface state 102 is shown in two places as an example of where a surface state may propagate, however these are for illustrative purposes and the surface state 102 may propagate at any of the interfaces between the first material 106 and the second material 108 shown in FIG. 8. Further, the rectilinear configuration shown in FIG. 8 is also for illustrative purposes and there are many different configurations where the boundary between two materials such as the first and second materials 106, 108 is three-dimensional.

As specified with respect to FIG. 6, the embodiment shown in FIG. 8, along with the other embodiments shown in FIGS. 1-10 may include other aspects shown in other figures, such as the gain medium 302, the source 306 of electromagnetic energy shown in FIG. 3 (where the gain medium 302 is electromagnetically pumped), the applied voltage 402 (where the gain medium 302 is electrically pumped), the apparatus 308 configured to convert radiative electromagnetic energy into a surface state (and/or from a surface state into radiative electromagnetic energy), and/or a different aspect of the other embodiments.

Figure 9:
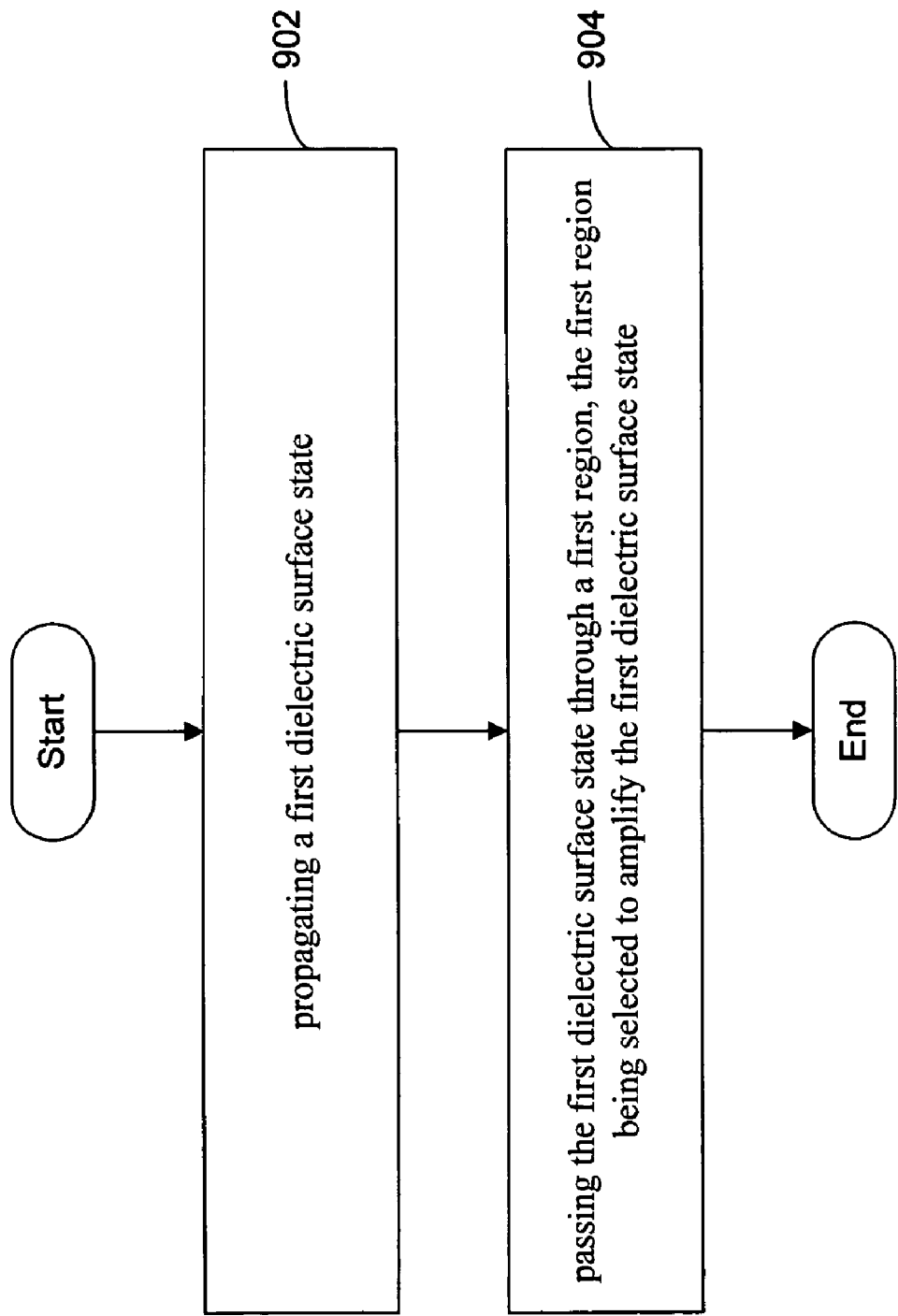
FIG. 9 is a flow chart depicting a method.

In one embodiment, depicted in the flow chart of FIG. 9, a method comprises: (902) propagating a first dielectric surface state; and (904) passing the first dielectric surface state through a first region, the first region being selected to amplify the first dielectric surface state. Passing the first dielectric surface state through a first region, the first region being selected to amplify the first dielectric surface state may include electromagnetically coupling the first dielectric surface state to a first gain medium (such as the gain medium 302 shown in FIG. 3) selected to amplify the first dielectric surface state.

In some embodiments, the first gain medium may be located at least partially within the first region. The first gain medium may be any of the gain media listed with respect to FIG. 3, including but not limited to a dielectric, a gas, a crystal, a rare earth element, an amorphous material, or a semiconductor.

The method may further comprise optically pumping the first gain medium, where optically pumping the first gain medium may include coupling optical electromagnetic energy to the first gain medium (such as the energy from the source 306 shown in FIG. 3).

The method may further comprise electrically pumping the first gain medium, where electrically pumping the first gain medium may include applying electrons to the first gain medium, removing electrons from the first gain medium, applying an electric field to the first gain medium, and/or applying an electric potential to the first gain medium. Electrical pumping of a gain medium is shown in FIG. 4 and described previously herein.

The method may further comprise converting radiative electromagnetic energy into the first dielectric surface state, such as with the apparatus 308 shown in FIG. 3. The method may further comprise converting the first dielectric surface state into radiative electromagnetic energy, the apparatus for which was previously described as being analogous to the apparatus 308.

The method may further comprise passing the first dielectric surface state through a second region, the second region being selected to amplify the first dielectric surface state. For example, the second region may be the second gain section 406 as shown in FIG. 4. The second region may be different from the first region, as is shown in FIG. 4, or the second region may be partially overlapping the first region. The first region (such as the first gain section 404 shown in FIG. 4) may have a first amplification factor and the second region may have a second amplification factor different from the first amplification factor. These amplification factors may be varied, by varying of the coupling of electromagnetic and/or electrical energy (depending on the type of gain medium). Further, varying the amplification factor may include decreasing the amplification factor to provide substantially zero amplification.

In some embodiments the first dielectric surface state may have first and second energy components, wherein the first region is selected to amplify the first energy component differently from the second energy component. For example, the first energy component may correspond to a first mode and the second energy component may correspond to a second mode different from the first mode. Or, the first and second energy components may correspond to different energy ranges.

Propagating a first dielectric surface state may include: propagating the first dielectric surface state along an interface between a first photonic crystal and a second medium different from the first photonic crystal; or propagating the first dielectric surface state along an interface between a first polar dielectric having a Restrahlen band and a second dielectric. The first polar dielectric having a Restrahlen band may include at least one of silicon carbide (SiC), lithium tantalate ($LiTaO_3$), lithium fluoride (LiF), or zinc selenide (ZnSe). Materials supportive of surface states have been described in detail with respect to FIG. 1.

Figure 10:
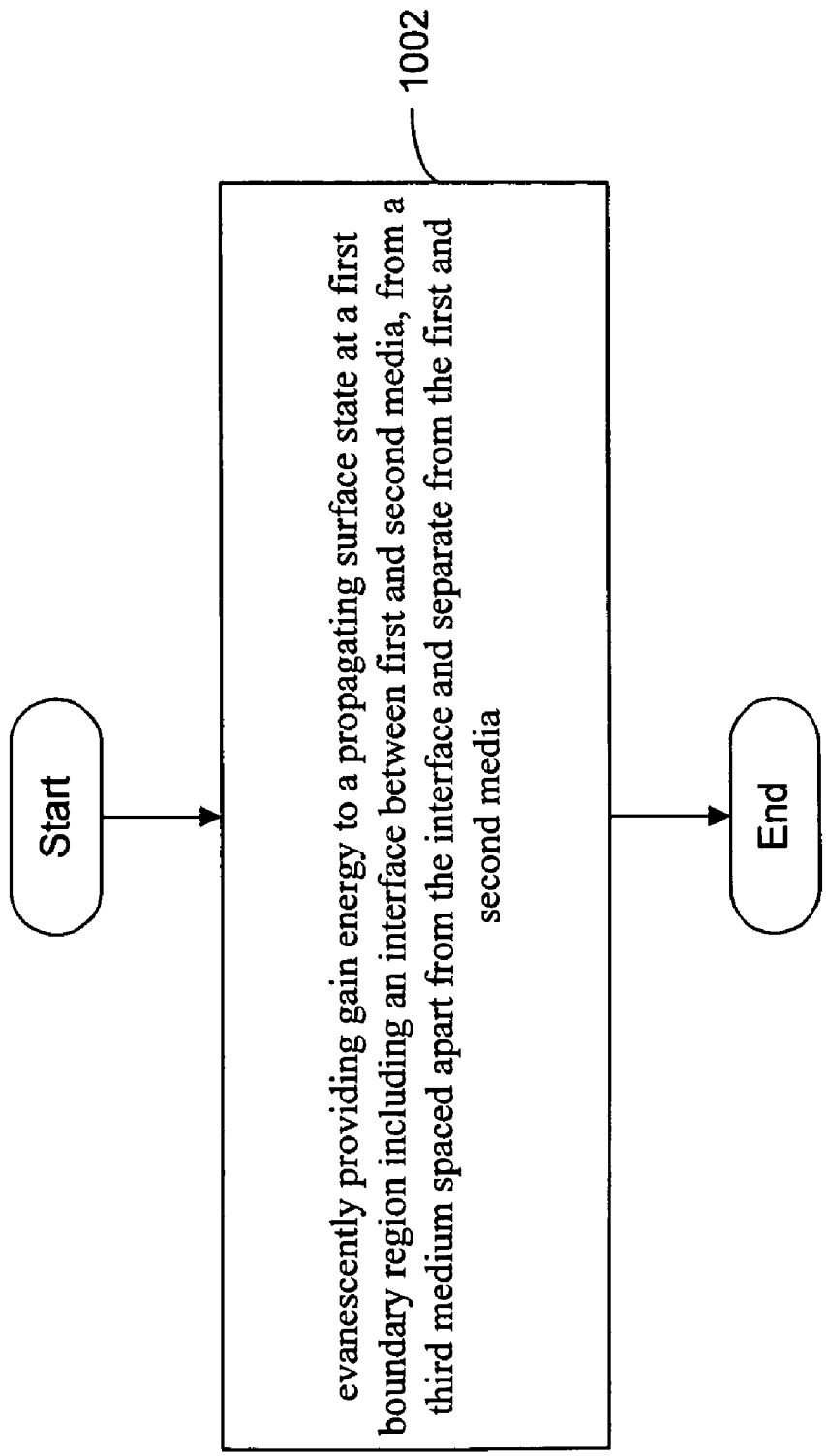
FIG. 10 is a flow chart depicting a method.

Although the above methods are described with respect to the flow chart of FIG. 9, these methods may be applicable to the flow charts of FIGS. 10 and 11, and may also be applicable to the embodiments shown in FIGS. 1-8.

In another embodiment, depicted in the flow chart of FIG. 10, a method comprises: (1002) evanescently providing gain energy to a propagating surface state at a first boundary region including an interface between first and second media, from a third medium spaced apart from the interface and separate from the first and second media.

An apparatus corresponding to the method may be found in the Figures, especially FIG. 6, however in this embodiment the first and second media would be in the first and third layers 602, 606, and the third medium would be in the second layer 604.

The method may further comprise evanescently providing gain energy to the propagating surface state at a second boundary region including an interface between the first and second media, from a fourth medium spaced apart from the interface and separate from the first and second media. The first and second boundary regions may be the same or different, and the fourth medium may be the same or different from the third medium.

In one embodiment the third medium has a first amplification factor and the fourth medium has a second amplification factor different from the first amplification factor.

In one embodiment the third medium that provides gain energy defines a homogeneous region. Such is the case, for example, of a gas, a crystal, a semiconductor, or other continuous media used for gain.

The method may further comprise: providing gain energy to the third medium, where providing gain energy to the third medium may include providing electromagnetic energy to the third medium and/or providing electrical energy to the third medium. Providing electromagnetic energy to a gain medium is shown in FIG. 3, and providing electrical energy to a gain medium is shown in FIG. 4.

Although the above methods are described with respect to the flow chart of FIG. 10, these methods may be applicable to the flow charts of FIGS. 9 and 11, and may also be applicable to the embodiments shown in FIGS. 1-8.

In another embodiment, depicted in the flow chart of FIG. 11, a method comprises: (1102) propagating a first magnetic surface state; and (1104) passing the first magnetic surface state through a first region, the first region being selected to amplify the first magnetic surface state.

In some embodiments, passing the first magnetic surface state through a first region includes electromagnetically coupling the first magnetic surface state to a first gain medium selected to amplify the first magnetic surface state, which may further include evanescently coupling the first magnetic surface state to the first gain medium.

In some embodiments, propagating a first magnetic surface state includes propagating a plasmon having a transverse electric component, where propagating a plasmon having a transverse electric component may include propagating a plasmon on a metal-insulator-metal (MIM) structure, previously described with respect to FIG. 5.

In one embodiment, propagating a first magnetic surface state may include propagating the first magnetic surface state along an interface between a first magnetic metamaterial and a second material different from the first magnetic metamaterial. Magnetic metamaterials have been described herein with respect to FIG. 5.

Although the above methods are described with respect to the flow chart of FIG. 11, these methods may be applicable to the flow charts of FIGS. 9 and 10, and may also be applicable to the embodiments shown in FIGS. 1-8.

Those having skill in the art will recognize that the state of the art has progressed to the point where there is little distinction left between hardware, software, and/or firmware implementations of aspects of systems; the use of hardware, software, and/or firmware is generally (but not always, in that in certain contexts the choice between hardware and software can become significant) a design choice representing cost vs. efficiency tradeoffs. Those having skill in the art will appreciate that there are various vehicles by which processes and/or systems and/or other technologies described herein can be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; alternatively, if flexibility is paramount, the implementer may opt for a mainly software implementation; or, yet again alternatively, the implementer may opt for some combination of hardware, software, and/or firmware. Hence, there are several possible vehicles by which the processes and/or devices and/or other technologies described herein may be effected, none of which is inherently superior to the other in that any vehicle to be utilized is a choice dependent upon the context in which the vehicle will be deployed and the specific concerns (e.g., speed, flexibility, or predictability) of the implementer, any of which may vary. Those skilled in the art will recognize that optical aspects of implementations will typically employ optically-oriented hardware, software, and or firmware.

In some implementations described herein, logic and similar implementations may include software or other control structures. Electronic circuitry, for example, may have one or more paths of electrical current constructed and arranged to implement various functions as described herein. In some implementations, one or more media may be configured to bear a device-detectable implementation when such media hold or transmit device detectable instructions operable to perform as described herein. In some variants, for example, implementations may include an update or modification of existing software or firmware, or of gate arrays or programmable hardware, such as by performing a reception of or a transmission of one or more instructions in relation to one or more operations described herein. Alternatively or additionally, in some variants, an implementation may include special-purpose hardware, software, firmware components, and/or general-purpose components executing or otherwise invoking special-purpose components. Specifications or other implementations may be transmitted by one or more instances of tangible transmission media as described herein, optionally by packet transmission or otherwise by passing through distributed media at various times.

Alternatively or additionally, implementations may include executing a special-purpose instruction sequence or invoking circuitry for enabling, triggering, coordinating, requesting, or otherwise causing one or more occurrences of virtually any functional operations described herein. In some variants, operational or other logical descriptions herein may be expressed as source code and compiled or otherwise invoked as an executable instruction sequence. In some contexts, for example, implementations may be provided, in whole or in part, by source code, such as C++, or other code sequences. In other implementations, source or other code implementation, using commercially available and/or techniques in the art, may be compiled/implemented/translated/converted into a high-level descriptor language (e.g., initially implementing described technologies in C or C++ programming language and thereafter converting the programming language implementation into a logic-synthesizable language implementation, a hardware description language implementation, a hardware design simulation implementation, and/or other such similar mode(s) of expression). For example, some or all of a logical expression (e.g., computer programming language implementation) may be manifested as a Verilog-type hardware description (e.g., via Hardware Description Language (HDL) and/or Very High Speed Integrated Circuit Hardware Descriptor Language (VHDL)) or other circuitry model which may then be used to create a physical implementation having hardware (e.g., an Application Specific Integrated Circuit). Those skilled in the art will recognize how to obtain, configure, and optimize suitable transmission or computational elements, material supplies, actuators, or other structures in light of these teachings.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

In a general sense, those skilled in the art will recognize that the various embodiments described herein can be implemented, individually and/or collectively, by various types of electro-mechanical systems having a wide range of electrical components such as hardware, software, firmware, and/or virtually any combination thereof; and a wide range of components that may impart mechanical force or motion such as rigid bodies, spring or torsional bodies, hydraulics, electromagnetically actuated devices, and/or virtually any combination thereof. Consequently, as used herein "electro-mechanical system" includes, but is not limited to, electrical circuitry operably coupled with a transducer (e.g., an actuator, a motor, a piezoelectric crystal, a Micro Electro Mechanical System (MEMS), etc.), electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), electrical circuitry forming a communications device (e.g., a modem, communications switch, optical-electrical equipment, etc.), and/or any non-electrical analog thereto, such as optical or other analogs. Those skilled in the art will also appreciate that examples of electro-mechanical systems include but are not limited to a variety of consumer electronics systems, medical devices, as well as other systems such as motorized transport systems, factory automation systems, security systems, and/or communication/computing systems. Those skilled in the art will recognize that electro-mechanical as used herein is not necessarily limited to a system that has both electrical and mechanical actuation except as context may dictate otherwise.

In a general sense, those skilled in the art will recognize that the various aspects described herein which can be implemented, individually and/or collectively, by a wide range of hardware, software, firmware, and/or any combination thereof can be viewed as being composed of various types of "electrical circuitry." Consequently, as used herein "electrical circuitry" includes, but is not limited to, electrical circuitry having at least one discrete electrical circuit, electrical circuitry having at least one integrated circuit, electrical circuitry having at least one application specific integrated circuit, electrical circuitry forming a general purpose computing device configured by a computer program (e.g., a general purpose computer configured by a computer program which at least partially carries out processes and/or devices described herein, or a microprocessor configured by a computer program which at least partially carries out processes and/or devices described herein), electrical circuitry forming a memory device (e.g., forms of memory (e.g., random access, flash, read only, etc.)), and/or electrical circuitry forming a communications device (e.g., a modem, communications switch, optical-electrical equipment, etc.). Those having skill in the art will recognize that the subject matter described herein may be implemented in an analog or digital fashion or some combination thereof.

Those skilled in the art will recognize that at least a portion of the devices and/or processes described herein can be integrated into an image processing system. Those having skill in the art will recognize that a typical image processing system generally includes one or more of a system unit housing, a video display device, memory such as volatile or non-volatile memory, processors such as microprocessors or digital signal processors, computational entities such as operating systems, drivers, applications programs, one or more interaction devices (e.g., a touch pad, a touch screen, an antenna, etc.), control systems including feedback loops and control motors (e.g., feedback for sensing lens position and/or velocity; control motors for moving/distorting lenses to give desired focuses). An image processing system may be implemented utilizing suitable commercially available components, such as those typically found in digital still systems and/or digital motion systems.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

Those skilled in the art will recognize that it is common within the art to implement devices and/or processes and/or systems, and thereafter use engineering and/or other practices to integrate such implemented devices and/or processes and/or systems into more comprehensive devices and/or processes and/or systems. That is, at least a portion of the devices and/or processes and/or systems described herein can be integrated into other devices and/or processes and/or systems via a reasonable amount of experimentation. Those having skill in the art will recognize that examples of such other devices and/or processes and/or systems might include—as appropriate to context and application—all or part of devices and/or processes and/or systems of (a) an air conveyance (e.g., an airplane, rocket, helicopter, etc.), (b) a ground conveyance (e.g., a car, truck, locomotive, tank, armored personnel carrier, etc.), (c) a building (e.g., a home, warehouse, office, etc.), (d) an appliance (e.g., a refrigerator, a washing machine, a dryer, etc.), (e) a communications system (e.g., a networked system, a telephone system, a Voice over IP system, etc.), (f) a business entity (e.g., an Internet Service Provider (ISP) entity such as Comcast Cable, Qwest, Southwestern Bell, etc.), or (g) a wired/wireless services entity (e.g., Sprint, Cingular, Nextel, etc.), etc.

In certain cases, use of a system or method may occur in a territory even if components are located outside the territory. For example, in a distributed computing context, use of a distributed computing system may occur in a territory even though parts of the system may be located outside of the territory (e.g., relay, server, processor, signal-bearing medium, transmitting computer, receiving computer, etc. located outside the territory).

A sale of a system or method may likewise occur in a territory even if components of the system or method are located and/or used outside the territory.

Further, implementation of at least part of a system for performing a method in one territory does not preclude use of the system in another territory.

All of the above U.S. patents, U.S. patent application publications, U.S. patent applications, foreign patents, foreign patent applications and non-patent publications referred to in this specification and/or listed in any Application Data Sheet, are incorporated herein by reference, to the extent not inconsistent herewith.

One skilled in the art will recognize that the herein described components (e.g., operations), devices, objects, and the discussion accompanying them are used as examples for the sake of conceptual clarity and that various configuration modifications are contemplated. Consequently, as used herein, the specific exemplars set forth and the accompanying discussion are intended to be representative of their more general classes. In general, use of any specific exemplar is intended to be representative of its class, and the non-inclusion of specific components (e.g., operations), devices, and objects should not be taken limiting.

With respect to the use of substantially any plural and/or singular terms herein, those having skill in the art can translate from the plural to the singular and/or from the singular to the plural as is appropriate to the context and/or application. The various singular/plural permutations are not expressly set forth herein for sake of clarity.

The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected", or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components, and/or wirelessly interactable, and/or wirelessly interacting components, and/or logically interacting, and/or logically interactable components.

In some instances, one or more components may be referred to herein as "configured to," "configured by," "configurable to," "operable/operative to," "adapted/adaptable," "able to," "conformable/conformed to," etc. Those skilled in the art will recognize that such terms (e.g. "configured to") can generally encompass active-state components and/or inactive-state components and/or standby-state components, unless context requires otherwise.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An apparatus comprising:
    a first layer including a first dielectric medium having a positive real part of a first dielectric constant in a first frequency range;
    a second layer including a second dielectric medium having a negative real part of a second dielectric constant in a second frequency range;
    wherein the first layer and the second layer form a first dielectric boundary region arranged to support a first dielectric surface state, the first dielectric surface state having a frequency that is within both the first frequency range and the second frequency range; and
    wherein the second layer includes a first gain medium selected to amplify the first dielectric surface state, wherein the first gain medium is arranged relative to the first dielectric boundary region for amplification of the first dielectric surface state.

2. The apparatus of claim 1 wherein the first gain medium includes at least one of a quantum dot, a dielectric, a gas, a crystal, a rare earth element, an amorphous material, or a semiconductor.

3. The apparatus of claim 1 wherein the second dielectric medium includes a photonic crystal.

4. The apparatus of claim 1 wherein the second dielectric medium includes a polar dielectric having a Restrahlen band.

5. The apparatus of claim 4 wherein the polar dielectric having a Restrahlen band includes at least one of silicon carbide (SiC), lithium tantalate ($LiTaO_3$), lithium fluoride (LiF), or zinc selenide (ZnSe).

6. The apparatus of claim 1 further comprising:
    a second dielectric boundary region arranged to support a second dielectric surface state, wherein the second dielectric boundary region is arranged relative to the first dielectric boundary region for coupling of the first and second dielectric surface states.

7. The apparatus of claim 6 wherein the coupled first and second dielectric surface states form a third dielectric surface state.

8. A method comprising:
    propagating a first dielectric surface state having a first frequency along an interface between a polar dielectric having a Restrahlen band and a second dielectric, wherein the polar dielectric having a Restrahlen band has a negative real part of a first dielectric constant in a first frequency range, and wherein the first frequency is within the first frequency range; and
    passing the first dielectric surface state through a first region, the first region being selected to amplify the first dielectric surface state.

9. The method of claim 8 wherein passing the first dielectric surface state through a first region, the first region being selected to amplify the first dielectric surface state includes:
    electromagnetically coupling the first dielectric surface state to a first gain medium selected to amplify the first dielectric surface state.

10. The method of claim 9 wherein the first gain medium includes at least one of a dielectric, a gas, a crystal, a rare earth element, an amorphous material, or a semiconductor.

11. The method of claim 9 further comprising:
optically pumping the first gain medium.

12. The method of claim 9 further comprising:
electrically pumping the first gain medium.

13. The method of claim 9 wherein the first gain medium has a first amplification factor, and further comprising:
varying the first amplification factor.

14. The method of claim 13 wherein varying the first amplification factor includes:
varying coupling of electromagnetic energy to the first gain medium.

15. The method of claim 13 wherein varying the first amplification factor includes:
varying coupling of electrical energy to the first gain medium.

16. The method of claim 8 wherein the first dielectric surface state has first and second energy components, and wherein the first region is further selected to amplify the first energy component differently from the second energy component.

17. A method comprising:
propagating a first dielectric surface state;
passing the first dielectric surface state through a first region, the first region being selected to amplify the first dielectric surface state;
wherein the first dielectric surface state has first and second energy components, and wherein the first region is further selected to amplify the first energy component differently from the second energy component; and
wherein the first energy component corresponds to a first mode and the second energy component corresponds to a second mode different from the first mode.

18. The method of claim 16 wherein the first energy component corresponds to a first frequency range and the second energy component corresponds to a second frequency range different from the first frequency range.

19. The method of claim 8 wherein the polar dielectric having a Restrahlen band includes at least one of silicon carbide (SiC), lithium tantalate (LiTaO$_3$), lithium fluoride (LiF), or zinc selenide (ZnSe).

20. An apparatus comprising:
a first layer including a first medium;
a second layer spaced apart from the first layer, the second layer including a first gain medium; and
a third layer at least partially interposed between the first layer and the second layer and including a third medium different from the first medium and the first gain medium, wherein the first layer and the third layer form a first boundary supportive of a first propagating surface state, and wherein the first gain medium is configured to evanescently couple to the first propagating surface state.

21. The apparatus of claim 20 wherein the first boundary supportive of a first propagating surface state is supportive of plasmon energy.

22. The apparatus of claim 20 wherein the first medium includes a first photonic crystal.

23. The apparatus of claim 20 wherein the first medium includes a polar dielectric having a Restrahlen band.

24. The apparatus of claim 23 wherein the polar dielectric having a Restrahlen band includes at least one of silicon carbide (SiC), lithium tantalate (LiTaO$_3$), lithium fluoride (LiF), or zinc selenide (ZnSe).

25. The apparatus of claim 20 wherein the first gain medium includes at least one of a quantum dot, a dielectric, a gas, a crystal, a rare earth element, an amorphous material, or a semiconductor.

26. The apparatus of claim 17 wherein the first mode corresponds to a first frequency range and the second mode corresponds to a second frequency range different from the first frequency range.

27. The apparatus of claim 17 wherein the first mode is a symmetric mode.

28. The apparatus of claim 17 wherein the first mode is a transverse electric (TE) surface state mode.

* * * * *